Aug. 4, 1942.  F. W. GOETZE  2,291,709
GASKET CONSTRUCTION
Filed Oct. 9, 1940  2 Sheets-Sheet 1

INVENTOR:
FREDERICK W. GOETZE
BY Herman Eisele
ATTORNEY

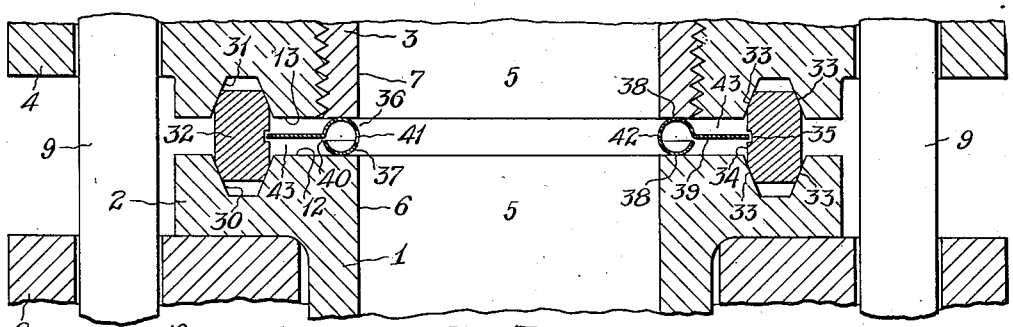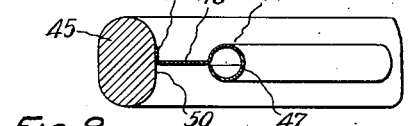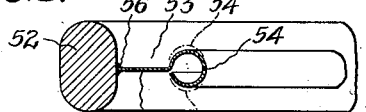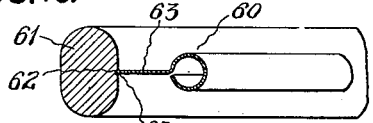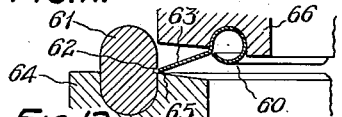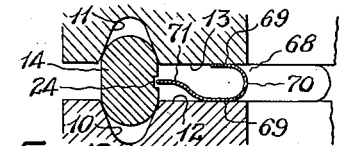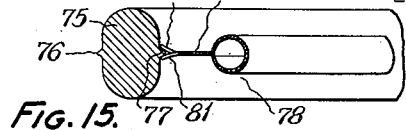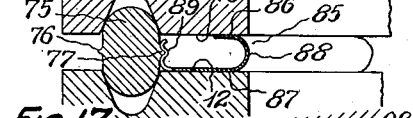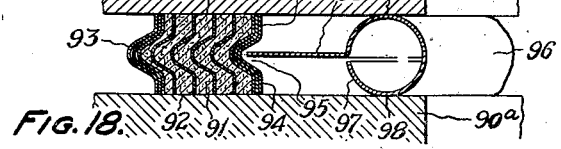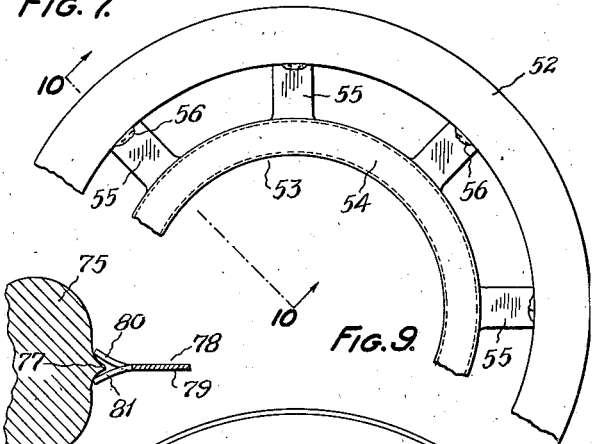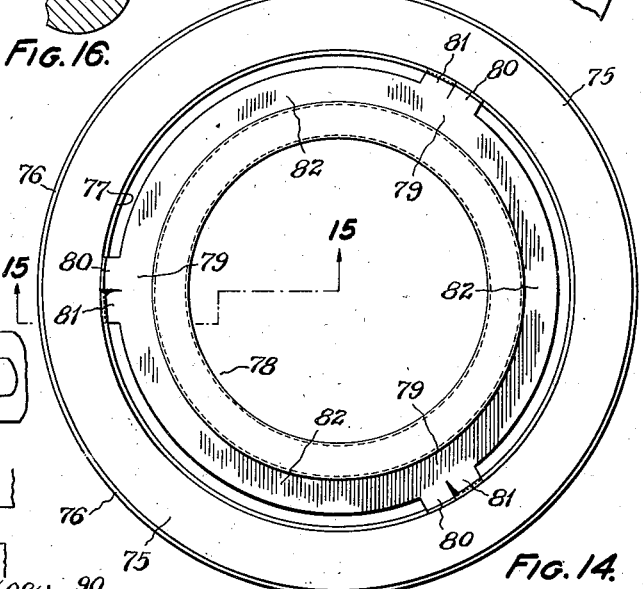

Patented Aug. 4, 1942

2,291,709

UNITED STATES PATENT OFFICE 2,291,709

GASKET CONSTRUCTION

Frederick W. Goetze, Plainfield, N. J.

Application October 9, 1940, Serial No. 360,376

13 Claims. (Cl. 285—137)

This invention relates generally to gasket constructions intended to be used for sealing joints formed in pressure piping or pressure vessels.

This invention is particularly intended to provide such gasket constructions which are especially adapted to seal fluids which may be generated in or confined in vessels under unusually high temperatures or pressures, or which may be transmitted thru conduits under unusually high pressures, temperatures or velocities.

Still more particularly this invention relates to gasket constructions comprised in the class known as ring-joint gaskets or wedge ring gaskets and including relatively rigid and incompressible metal rings utilized as the fluid tight seal forming element.

Ring-joint or wedge ring gaskets of this class are particularly well adapted for sealing fluids confined under pressures of the order of several thousand pounds and/or temperatures approaching 1000° F., such as are encountered, for instance, in hydraulic installations, high pressure steam systems, oil refinery service and the like. Such ring-joint gaskets usually consist of single solid metallic rings made of preferably relatively non-corrosive material and are either elliptical, oval or octagonal in transverse section and are wedged into a pair of opposed coaxial grooves machined in the juxtaposed joint flanges or other joint connections, by bolts or other suitable means. These ring-joint gaskets and the grooves in the connections are necessarily carefully machined to extreme accuracy and are additionally provided with a high quality of smooth surface finish.

These ring-joint types of gaskets of necessity, are larger in diameter than the interior of the conduit or opening which they are intended to seal, leaving a considerable space or recess between the inside of the ring and the bore of the conduit or opening and extending outwardly in a radial direction. This space is, also of necessity, of considerable width in a direction parallel to the axis of the conduit, this width being from 40% to 50% of the total width of the ring-joint gasket.

This annular recess, opening into the conduit, causes considerable eddy current effects to take place at the joint connections. It has been found, when ring-joint gaskets have been installed under severe conditions of fluid pressure, temperature or velocity, that the corners formed by the conduit and the faces of the connections adjacent the recesses referred to, have become seriously worn off due to the eroding action of these eddy currents, thereby still further enlarging the annular recess around the conduit at the joint and thereby increasing the deteriorating action. A severe pitting and corrosion of the opposed spaced faces of the flanges or other connections at the joint between the ring-joint gasket and the opening is also frequently noted after the rings have been installed for a period of time. This progressive erosion, corrosion and pitting accompanied also, in some cases by chemical action, attacks the ring-joint gasket and progressively eats into the actual sealing surface formed between the groove and the ring-joint gasket, thus not only endangering the maintenance of the fluid seal but also destroying the value of the ring for re-use in making alterations or repairs.

It is a prime object of this invention to overcome the above described and other deteriorating actions by providing a gasket construction which will prevent the erosion of the inner corners of the conduit connections and which will prevent the pitting, erosion, corrosion, and accompanying chemical action on the surfaces of the joint structure usually exposed to and attacked by the fluids in joints utilizing ring-joint gaskets.

It is a further important object of this invention to provide a gasket construction which will prevent the erosion, pitting, corrosion, chemical or other deteriorating action upon the seal ring by the fluids enclosed or travelling in the conduits.

It is a further object of this invention to prevent the formation of eddy currents in the travelling fluid and the consequent resistance to the flow at joints utilizing ring-joint gaskets.

It is a further and more specific object of this invention to provide an auxiliary seal or protective seal to protect the ring-joint gasket and the joint connections against the deteriorating effects pointed out.

It is a further specific object of this invention to produce such an auxiliary gasket or protective seal which will be permanently associated with the ring-joint gasket in order that the ring-joint gasket and the protective seal may constitute a gasket unit and may be manipulated as a unitary assembly in handling and installation.

It is a further specific object of this invention to provide a gasket protective seal of this type which may be adapted to be either fixedly combined with the ring-joint gasket or manually disengageably mounted on the ring-joint gasket.

It is a further and ancillary object of this invention to provide an auxiliary protective seal which may be made of different material from the material of the ring seal gasket.

It is a further specific object of this invention to provide such an auxiliary protective seal which has a floating connection with the ring-joint gasket whereby the auxiliary seal may find its most effective seat, free from any restraint caused by the ring-joint gasket.

It is a further specific object of this invention to provide an auxiliary protective seal which is secured to the primary gasket by means of a connection which is adapted to yield in an axial direction so as to permit the primary gasket and the protective seal to assume positions in different planes in the joint without the imposition of undue stress on either of the sealing elements.

It is a further specific object of this invention to produce an improved and novel form of sheet metal protective seal which will be simple in construction and which will be efficient in protecting a gasket interposed between spaced opposed flanges against erosion, corrosion and other deteriorating effects of the sealed fluid.

Further and more specific objects of this invention will become apparent from the following description and claims.

Referring to the drawings:

Fig. 6 is a transverse sectional view of the ring-joint or wedge ring gasket forming the primary fluid sealing element of the gasket unit illustrated in Figures 1, 2 and 3, this view illustrating this fluid seal forming gasket element prior to its assembly with the protective seal element.

Fig. 7 is an axial sectional view similar to Fig. 1 showing a slightly modified cross sectional shape of ring-joint gasket and an additional feature embodied in the protective seal.

Fig. 8 is a fragmentary axial sectional view similar to Fig. 3 illustrating a modified form of this invention in which the gasket and protective seal are frictionally engaged one with the other.

Fig. 9 is a fragmentary detached plan view similar to a part of Fig. 2 showing another modified form of gasket and protective seal assembly unit in which the two elements are secured together by welding.

Fig. 10 is an axial section thru the gasket unit shown in Fig. 9, this section being taken on the plane indicated by line 10, 10 in Fig. 9.

Fig. 11 is another fragmentary axial sectional view similar to Fig. 3 showing a still further modified form of this invention in which the gasket and protective seal are mechanically fixed to each other.

Fig. 12 is an axial sectional view of the elements illustrated in Fig. 11 prior to their assembly and showing also fragmentarily certain die parts which may be utilized for assembling these elements.

Fig. 13 is another fragmentary sectional view showing a modified form of protective seal ring associated with a ring-joint gasket of the type illustrated in Fig. 6, this view showing also portions of the joint connections.

Fig. 14 is a detached plan view similar to Fig. 2 showing a gasket unit consisting of a modified form of ring-joint gasket and a modified form of mounting of the protective seal on this modified gasket.

Fig. 15 is an axial sectional view thru the gasket unit illustrated in Fig. 14 this view being taken on the plane indicated by line 15, 15 in Fig. 14.

Fig. 16 is an enlarged view of a fragmentary portion of Fig. 15.

Fig. 17 is another fragmentary sectional view showing a modified form of protective seal associated with a ring-joint gasket of the type illustrated in Figures 14 to 16, this view showing also portions of the joint connections.

Fig. 18 is another axial sectional view, drawn to a somewhat enlarged scale, showing the improved gasket protective seal ring associated with a gasket of a type different than those illustrated in the preceding figures.

Figure 1:
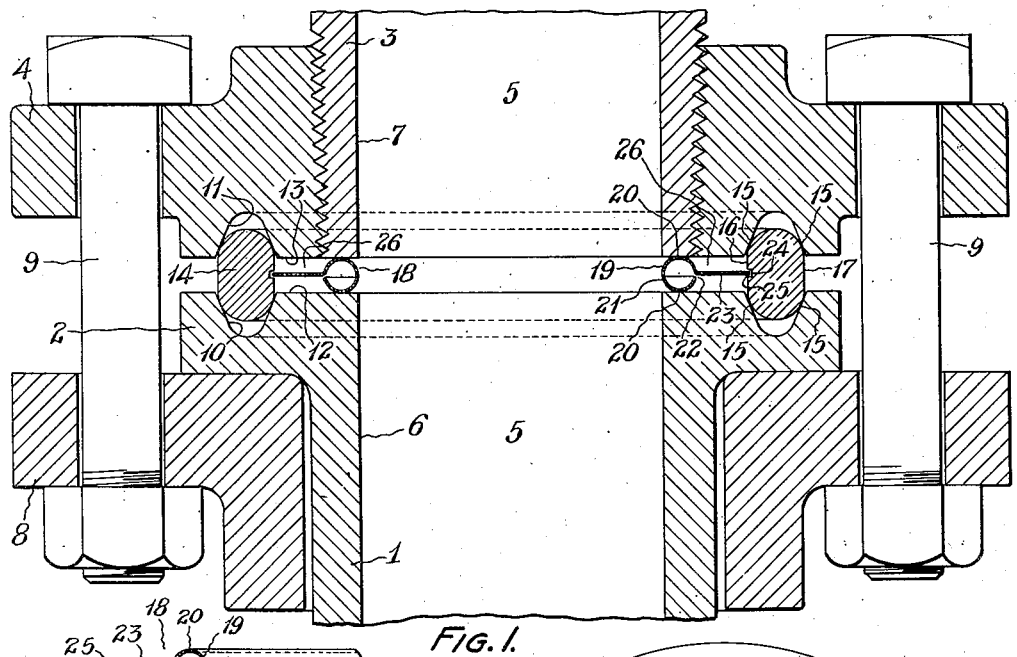
Fig. 1 is an axial section of a joint formed between two sections of pipe, such as is used in extremely high pressure service, the joint being sealed by one form of improved gasket construction embodying the principles of this invention.
Figure 5:
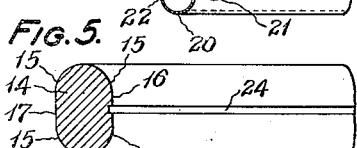
Fig. 5 is an axial section thru this gasket protective seal, this view being taken on the plane indicated by line 5, 5 in Fig. 4.

Referring first to the construction illustrated in Figures 1 to 6, and with particular reference to Fig. 1, there is indicated at 1 a pipe section formed with an upset outwardly flanged end 2. Opposed to this flanged end 2 and aligned with the pipe 1 is a pipe section 3 having a threaded connection with a flange 4 formed with a plurality of bolt holes. As will appear, the pipe sections 1 and 3 form a substantially cylindrical opening or conduit 5 defined by the aligned interior walls 6 and 7 of the pipe sections 1 and 3, respectively. Engaging the rear face of the outwardly flanged end 2 and loosely encompassing the pipe section 1 is a flange 8 formed with bolt holes aligned with the bolt holes in the threaded flange 4. A plurality of suitable bolts 9 engage the flange holes and serve to clamp the flanges together, thus serving as a means for forcing the joint members toward each other and into proper engagement with the elements of the interposed gasket construction unit to be described.

The opposed pipe sections and flanges just described are shown to be of different types for purposes of illustration. These opposed pipe sections and joint flanges may, however, be identical or may assume any one of many other well known forms depending upon the conditions of pressure, temperature and preferences of the designer, and these joint forms may be combined in various ways.

In the following specification and claims the term "axial" when used with reference to portions of the gasket unit or its supporting structure, is intended to indicate a direction parallel to or in the direction of the axis of the pipe sections. Likewise the term "radial" as used in this specification and claims, is intended to indicate a direction transverse to the axis of the pipe sections which are connected by the joint, that is in a direction radial with respect to the center of the joint. The terms "outwardly" or "inwardly" are intended to indicate directions respectively away from or toward the axis of the pipe sections. The juxtaposed elements constituting the joint connections are formed with opposed coaxial grooves or recesses as indicated at 10 in the upset end 2 and at 11 in the flange 4. These grooves may assume any one of various configurations but in the form illustrated in Fig. 1, are shown tapered in cross section with side walls diverging toward the faces of the flanges in which they are machined. For reasons well known to those skilled in this art, these grooves are necessarily spaced a substantial distance from the inner edge of the cylindrical opening formed in the joint connections, as a result of which a considerable space intervenes between the inner edges of the grooves 10 and 11 and the interior walls 6 and 7 of the pipe sections. The flanges or joint connections interiorly of the grooves are usually formed with opposed parallel faces as indicated at 12 and 13, respectively.

Seated in the opposed coaxial grooves 10 and 11 is a preferably solid metal ring 14 serving as a gasket to form a fluid tight seal with the joint flanges. This ring 14 is formed with axially opposed sealing areas 15, 15 adapted to engage the diverging walls of the grooves 10 and 11 in fluid tight relation. This ring gasket is further formed with inner and outer side walls indicated at 16 and 17, respectively. Solid metal gasket rings of this type, used alone as sealing elements or gaskets in opposed coaxial grooves, are well known and are variously designated as ring-joint gaskets or wedge ring gaskets.

The flanges and rings of this type of joint are made of various grades and types of metal depending upon the service and of ample strength to resist the strain imposed on the joint. The material of the ring, however, while it is relatively rigid and relatively incompressible, is nevertheless made softer than the material of the flanges which are hardened by heat treating, if necessary, in order that the conformation of the grooves in the flanges will not be deformed or distorted when the flanges are drawn up into fluid tight engagement with the gasket ring. As a result, the rings are slightly deformed as the pressure is applied by the flanges. Suitable materials for these ring-joint gaskets or wedge rings 14 are soft steel, iron, stainless steel, bronze and the like. It will appear that these ring gaskets and grooves are mutually so proportioned that the gaskets are not forced to seat against the bottom of the grooves in the tightening of the joint.

Associated with and forming a novel gasket construction unit with the wedge ring 14 is an auxiliary annular element adapted to protect the gasket 14 and the associated joint elements from corrosion, erosion, pitting and other chemical and mechanical deteriorating actions. This element indicated generally at 18 may accordingly be designated as an auxiliary or secondary gasket or as a gasket protective seal ring. This protective ring 18 is preferably made of relatively resilient sheet metal and is formed at its inner periphery with a hollow tubular resilient bead by suitably curling the sheet metal into the conformation of a substantially closed torus, indicated at 19. This bead or torus 19 is formed with axially opposed face portions 20, 20 engaging the opposed parallel faces of the flanges 12 and 13 at narrow annular areas adjacent the inner peripheries of these faces, that is adjacent the opening 5. These axially opposed face portions 20, 20 of the bead 19 are connected by a preferably resilient inwardly curved wall portion 21. As will appear, the diameter of the bead 19 is substantially less than the axial dimension of the ring-joint gasket. It will also appear that the bead 19 is in the same median plane as the ring-joint gasket and that this bead 19 is concentric with and radially spaced from the ring-joint gasket. A peripheral slot indicated at 22 's formed on the outer face of the bead or torus 19 substantially in the median plane of the torus which serves the purposes of providing resilience and of venting the interior of the torus.

Integrally formed with the metal of the wall of the bead 19 and extending radially outwardly therefrom is a web 23. In the form illustrated, this web is substantially coincident with the median plane of the bead and of the ring-joint gasket. The web 23 may assume any one of a number of conformations only one preferred form being shown in Figures 1 to 5. The essential purpose, however, of this web is to form a means providing for the connecting of the protective seal or ring with the ring-joint gasket in order that this protective ring may remain properly associated with the ring-joint gasket during shipping, handling, installation and removal of the gasket unit and this connecting means may accordingly be designated as a means for operatively locking the protective ring and the ring-joint gasket to each other.

Various types of means may be used for fixedly associating the web 23 with the ring-joint gasket 14, one preferred type being illustrated in Figures 1 to 6. In this type a groove or recess 24 is formed in the inner periphery or in the inner side wall 16 of the ring-joint gasket 14. The outer periphery 25 of the web 23 of the gasket protective ring 18 is preferably made slightly larger than the inner diameter of the wall 16 of the ring 14 so as to permit the protective ring to be forced into position in the groove by manually or mechanically pressing the element 18 into a position in which the outer periphery of the web 23 will snap into the groove 24. It will also be noted that the groove 24 is slightly larger in diameter than the periphery 25 and is slightly wider in an axial direction than the thickness of the sheet metal. This relationship provides a means for fixing the protective element 18 with respect to the fluid sealing gasket 14 and at the same time provides for a limited axial and radial play between the protective ring 18 and the ring-joint gasket 14.

The gasket protective seal 18 may be made of any material suitable for the particular service requirements, and carbon steel, stainless steel, iron, bronze, aluminum, Monel metal and other metals and alloys have been used with satisfactory results. It is evident that the hereinbefore described construction permits the material of the ring-joint gasket and the metal of the protective seal to be entirely different and each may, accordingly, be made of the material best suited for its service.

Figure 3:
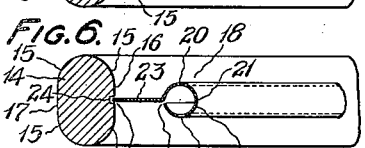
Fig. 3 is an axial section thru the gasket unit illustrated in Fig. 2, this view being taken on the plane indicated by line 3, 3 in Fig. 2.
Figure 4:
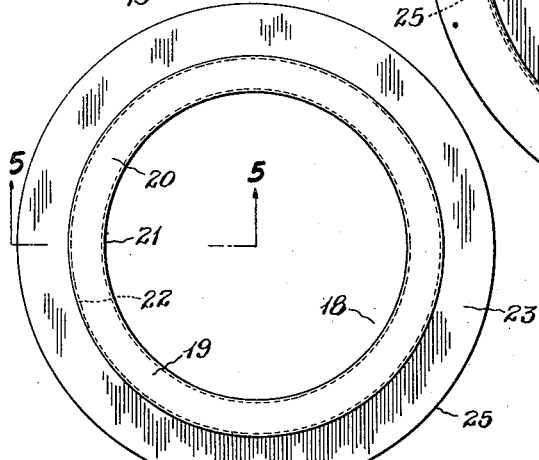
Fig. 4 is a detached plan view of the auxiliary gasket or protective seal element forming a part of the gasket unit illustrated in Figures 2 and 3.
Figure 2:
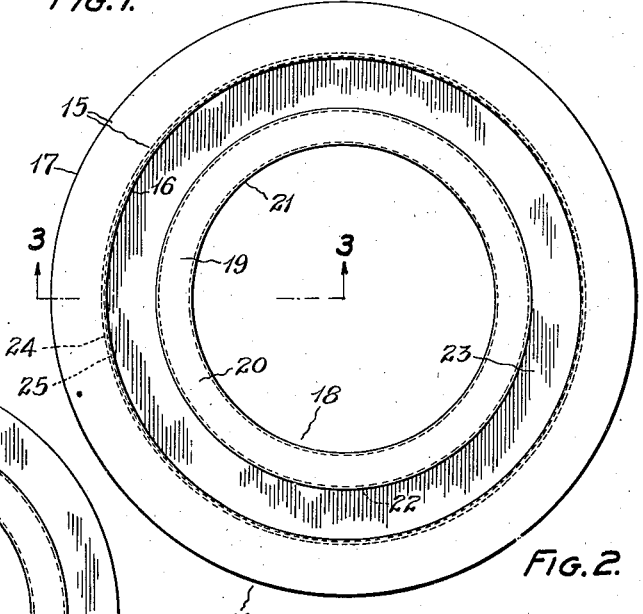
Fig. 2 is a detached plan view of the improved gasket unit comprising the ring-joint gasket and associated auxiliary gasket or protective seal element shown in Fig. 1.

It will be understood without detailed explanation that a gasket construction unit as illustrated in Figures 2 and 3 and consisting of the ring-joint gasket 14 and the gasket protective seal ring 18, may readily be handled and shipped without any danger of separation of the two essential elements constituting this unit.

It will also be evident that such a gasket may readily be installed between the flanges or joint connections when the opposed faces of the flanges or joint connections are spaced apart a distance sufficient to permit the insertion of the gasket 14. It will be clear that during such installation there is no danger that the protective seal will inadvertently become separated from the gasket or that the seal will slip into the flange groove or conduit opening or that the seal will otherwise interfere with the proper positioning of the gasket, and hence a trouble free installation is assured.

It will also be understood that, after the ring-joint gasket 14 has been partially seated in its opposed grooves, the flanges 4 and 8 may be drawn together by means of the bolts 9 or any other suitable means adapted to advance the flanges toward each other.

It will also be evident that, in this installation, the bead 19 of the gasket protective ring 18, having been selected of proper size will automatically position itself between the opposed faces 12 and 13 around the periphery of the opening 5 and that this will occur without any special precautionary measures on the part of the mechanic. The drawing up of the flanges to make a satisfactory joint, as will be understood, is continued until the ring-joint gasket 14 is sufficiently tightly seated against the walls of the grooves 10 and 11, and slightly deformed if necessary, so as to produce a fluid tight seal between the ring-joint gasket and the flanges. The size of the bead 19 of the protective seal ring 18 is so selected that simultaneously with the formation of a fluid tight seal between the flange grooves and the ring-joint gasket, the axially opposed face portions 20, 20 will be in resilient engagement with the parallel faces 12 and 13 of the flanges and, in the final position, the bead 19 will be slightly deformed so as to maintain the resilient engagement of the face portions 20 with the faces 12 and 13 during various conditions of operating pressure and temperature.

The limited axial and radial play between the protective ring seal 18 and the ring-joint gasket 14 permits the seal to assume its seat on the flange faces independently of any restraint which might otherwise be imposed on the seal by the position of the ring-joint gasket.

Conversely, it is also evident that this floating seal will in no respect interfere with the freedom of the ring-joint gasket in finding its most effective seat.

The web 23 of the protective seal being formed of relatively thin resilient sheet metal is accordingly adapted to yield in response to an axial stress, and in extreme cases this yielding characteristic of the web will readily permit relative axial movement of the gasket 14 and bead 19.

It should also be noted that the ring-joint type of gasket maintains fluid tightness with a minimum of applied pressure and it is not desirable to impose an additional proportionately heavy load to seal the gasket against the deteriorating action of fluids circulating past the joint or for any other purpose and it is evident that the relatively resilient bead 19 effectively performs the function of sealing the ring-joint gasket without the imposition of any objectionable additional load to interfere with the sensitiveness of the joint tightening.

The bead 19 forms an auxiliary gasket or seal which to a very substantial extent prevents the passage of the fluid from the opening 5 into the chamber 26 formed between the ring-joint gasket 14 and the seal ring 19 and between the parallel faces 12 and 13. While it is not contemplated that this sheet metal seal 18 completely prevents the passage of fluid under high pressure into the chamber 26, the seal 18, when formed with an impervious wall 21 between the opposed faces 20, effectively restrains the free access of the sealed fluid into the chamber 26, and substantially prevents the infiltration of any additional fluid into the chamber 26 after the chamber has once been filled with fluid under pressure. This is particularly true when the pressure in the chamber 26 is equalized with the pressure in the conduit 5.

It will accordingly be evident that no considerable movement of fluid will occur over the faces 12 and 13 of the connections and certainly no considerable deteriorating action such as is caused by rapidly moving fluid will deleteriously attack either the gasket 14 or the seal formed by the gasket 14 and the groove walls.

It will also be clear that, the bead 19 being disposed adjacent the opening 5 with its inner periphery in alignment with the pipe walls 6 and 7, a substantially smooth surface will be formed for the rapidly travelling fluid between the surfaces 6 and 7 of the pipe sections 1 and 3. This feature effectively eliminates turbulence and eddy currents which are responsible for the eroding action which takes place at the inner corners formed at the recess between opposed joint connections.

It will also be clear that the fluid entrapped in the chamber 26 is not only stationary and therefor mechanically inactive, but this fluid, due to the fact that it is not rapidly replaced is also chemically relatively inactive and excessive corroding or chemical action upon the ring joint gasket 14 is practically entirely eliminated.

In some types of installations pressures are applied rather suddenly or rapid fluctuations in pressure take place in the sealed fluid in the conduit. At low pressures such sudden pressure applications or fluctuations would not materially affect a gasket construction such as hereinbefore described. In high pressure systems, however, where tremendous pressures are suddenly applied or where a small percentage of pressure variation may in effect constitute a considerable actual variation in such pressure, such pressure changes may seriously affect the gasket structure.

As stated hereinbefore, the chamber 26 in the form of the invention illustrated in Figures 1 to 6 is assumed to be gradually filled with fluid under pressure, and, once filled, normally remains under this pressure for considerable periods. It will be evident that any sudden application of pressure of the order of those incurred in this art would be likely to cause a blow out or a serious deformation of the bead 19 of the protective seal.

It will also be evident that an excessively high pressure remaining in the chamber 26 after a drop of the pressure in the conduit, would cause a collapse or serious distortion of the protective seal. In order to prevent the blow out or other deformation or injury to the protective seal, an aperture may be provided in the inner normally imperforate wall of the bead 18. This feature is illustrated in Fig. 7 in which the joint elements are for the most part identical with the corresponding joint elements illustrated in Fig. 1 as is indicated by the use of identical reference characters for the corresponding parts in the two figures.

In this figure, slightly different coaxial opposed grooves 30 and 31 are provided in the parts 2 and 4 being formed with flat bottoms in order to be better adapted to receive a modified form of the ring-joint gasket 32 which is substantially octagonal in cross section and is formed with sealing areas 33, 33 engaging the side walls of the grooves. As in the previously described embodiment, the inner wall 34 of the ring-joint gasket 32 is formed with a preferably annular groove or recess 35. Interposed between the parallel joint surfaces 12, 13 is a gasket protective element 36, formed at its inner periphery with a hollow tubular resilient bead 37 having axially opposed face portions 38, 38 engaging the spaced parallel faces 12 and 13 of the joint flanges. Formed integrally with the metal of the wall of the bead 37 is a radially outwardly extending web 39 whose periphery is suitably sized to permit the protective ring to be locked in position in the groove 35 as explained in connection with the construction illustrated in Figures 1 to 6.

Adjacent its median plane on its outer side, the bead 37 is formed with a relatively narrow peripheral slot 40 and an aperture 41 is formed in the normally imperforate inwardly curved wall portion 42 connecting the face portions 38, 38.

As will appear, there is thus formed a path forming a communicating passage from the opening 5 thru the aperture 41 and slot 40 into the chamber 43 formed between the ring-joint gasket 32, bead 37 and joint faces 12 and 13. Communication between the portions of the chamber 43 above the web 39 and below the web 39 is established by virtue of the loose mounting of the web 39 in the groove 35. If desired, of course, the web 39 may be formed with one or more perforations or an additional aperture may be formed in the outer wall of the bead 37 above the web 39.

The provision of this passage between the chamber 43 and the opening 5 in the conduit permits a sufficiently rapid equalization of pressure behind the bead 37 in response to the application of or fluctuation in pressure in the conduit 5 to prevent any material deformation or permanent distortion of the gasket protecting seal ring.

The seal protecting ring 36 will perform the function of protecting the ring-joint gasket as well as the adjacent joint surfaces substantially as effectively as the seal described in connection with Figures 1 to 6. It will be evident for instance that the presence of a single or even several small apertures in the bead 37 will not produce any objectionable circulation of fluid between the conduits 5 and the chamber 43 when the pressures are equal nor will this aperture affect the eddy current preventing function of the gasket protecting element.

As hereinbefore stated, many other means may be provided for connecting the gasket protecting element or seal with the rigid ring-joint gasket or for mounting this protective element on the rigid ring.

Fig. 8 illustrates one such means in which the rigid ring-joint gasket is indicated at 45 and the gasket protective seal at 46, the seal being provided with a bead 47. Integrally formed with the metal of the bead is a radially outwardly extending web 48 which preferably terminates at its outer end in an upturned flange 49. The inner wall of the gasket 45 is preferably formed with a substantially cylindrical portion 50 which is frictionally engaged by the outer peripheral flange 49 on the seal 46, the respective diameters of the surface 50 and the flange 49 being suitably selected so that a frictional engagement of the desired intensity is produced. This arrangement permits the protective seal to be permanently mounted on the gasket, but also, if desired, readily removable therefrom. It will also be apparent that this frictional mounting will permit the protective seal to be automatically shifted on the gasket during the tightening of the joint, responsive to the axial position of the seal engaging surfaces of the joint.

Figures 9 and 10 illustrate another type of connection between a rigid gasket ring 52 and a sheet metal protecting seal ring 53, formed with a bead 54 similar to the bead 19. Portions of the web of this seal ring may be cut away, however, leaving a series of spaced arms 55 integrally formed with the metal of the bead and extending outwardly therefrom to a point in substantial engagement with the inner periphery of the rigid ring 52. The connection between the ring 52 and the arms 55, illustrated in Figures 9 and 10, consists of welding such as indicated, for instance, at 56. This construction is particularly provided for those cases in which it is desired to permanently fix the protecting bead to the ring-joint gasket and in which there is required at the same time extreme axial yieldability of the bead relatively to the gasket 52, the broken line positions of the bead 54 indicating such axially shifted positions.

Fig. 11 indicates another method of connecting a gasket protective element 60 with the rigid ring 61. In this instance a groove 62 may be formed in the inner wall of the rigid ring 61, this groove being of substantially the same axial width as the thickness of the metal from which the seal ring 60 is formed. The outer periphery of a web 63 formed on the seal 60 being of a diameter slightly larger than the diameter of the inner wall of the ring 60, is readily forced by manual or mechanical means axially along the inner wall of the ring 61 until the periphery of the web 63 snaps into the groove 62. The relation of the groove width and gauge of metal pointed out adapts this construction for mechanically fixing the protective seal ring relatively to the rigid ring 61. It will be understood, however, that the dimensions of the periphery of the web 63 and the groove 62 may be so selected that the seal 60 may be manually removable, if desired.

Fig. 12 illustrates another method by means of which the seal 60 may be firmly fixed in the groove 62 in the above described construction. In this Fig. 12, 64 indicates a die member formed with an annular recess adapted to receive the ring 61 and additionally formed with a shoulder 65 adjacent the groove 62 and adapted to guide the periphery of the previously dished conical web 63 into the groove 62 when the punch element 66 forces the bead of the seal 60 downwardly. Provision is made, as will appear from the drawings, to depress the bead of the element 60 beyond the center in view of the resilience of the metal which brings the web 63 to a position substantially in the median plane of the gasket and bead.

Fig. 13 illustrates a modified form of protecting seal 68 combined with a rigid ring-joint gasket of the type illustrated in Figures 1 to 6. This seal is formed with an inner periphery substantially U shaped in cross section and provided with axially opposed upper and lower faces 69, 69, adapted to engage the flange surfaces 12 and 13. These faces 69 are connected with a resilient wall 70 forming the inner periphery of the seal ring. Extending outwardly from the metal forming one of the faces 69 is a web 71 which connects with the ring 14 in any desired manner, as for instance by means of the groove 24 formed on the inner periphery of the ring 14.

Figures 14, 15 and 16 illustrate a modified form of ring-joint gasket or wedge ring 75 which has a contour slightly different from that previously shown, this contour resulting from the method of manufacture of this type of ring-joint gasket. The gaskets, hereinbefore described, are usually produced by a series of machining operations. The type of ring illustrated in Figures 14 to 16 is produced in whole or in part by die forming operations, the last operation being usually performed with a set of coining dies for sizing and smoothing the ring which is accompanied by a slight upsetting resulting in the formation of ridges 76 and 77 on the outer and inner walls, respectively, of these die formed ring-joint gaskets. The inner ridge 77 forms a convenient means for mounting a protective seal 78 on the ring 75. For this purpose the seal 78 is formed with a plurality, preferably three or more, pairs of adjacent bendable ears or lips 80 and 81, formed at the outer periphery of outwardly extending web portions 79. The diameter of the circle circumscribed about the outer edges of the lips 80 and 81 is greater than the inner diameter of the ridge 77 and preferably substantially the same as the inner diameter of the inner vertical wall of the ring 75 above and below the ridge 77. In the position in which the seal 78 is mounted on the ring 75 one of the adjacent pair of lips, 80 as shown in the drawings, engages one side of the ridge 77, the upper side, and the other lip 81 engages the under side of this ridge, as clearly illustrated in Figures 15 and 16. In order to mount this seal 78 on the ring 75, it is only necessary to bend a number of the lips sufficiently to permit them to pass over the ridge 77 and the lips may then be bent toward the ridge sufficiently to engage the ridge as tightly as may be desired.

Circumferentially intermediate the web portions 79, radially outwardly extending web segments 82 may be provided, if desired, integrally formed with the sheet metal of the bead for the purpose of adding strength to the bead against radial distortion.

Fig. 17 illustrates another modification of this gasket construction showing the combination of a ring-joint gasket of the type illustrated in Figures 14 to 16 in combination with a protective seal of the general character of the seal 68. Referring to Fig. 17 the seal is indicated generally at 85 and is formed with an upper narrow outwardly extending surface 86 engaging the joint surface 13 and a wide outwardly extending web 87 seated against the joint surface 12, the portions 86 and 87 being connected by a resilient portion 88. The web 87 preferably extends outwardly to a position adjacent the ring 75 and is formed at this point with a plurality of upwardly projecting resilient ears or fingers 89, only one of which is shown, these fingers being formed with a recess adapted to resiliently engage the ridge 77 and thus providing a manually disengageable mounting of the seal 85 on the ring 75.

In its broadest aspects, this invention is not limited to the use of a ring-joint gasket or wedge ring type of gasket as the fluid sealing gasket in this improved gasket construction. Many of the advantages and objects of this invention can be fulfilled by combining the gasket protective seal element hereinbefore described, with other types of sealing gaskets, one such combination being illustrated in Fig. 18.

Referring to this figure, 90 and 90a indicate opposed plane faced flanges interposed between which is a gasket 91 formed with axially opposed sealing faces 92, 92, engaging the faces of the flanges 90 and 90a. The gasket 91, for purposes of illustration, is a gasket of a well known type, formed of spirally wound alternate metal and packing material strips of the type illustrated, for instance, in my Patent No. 2,192,739. This gasket is formed with an outer bead 93 and with an inner wall 94 formed with a centrally disposed groove 95. The protective seal generally indicated at 96 is formed with a bead 97 similar to the bead 19 but of a diameter substantially identical with the thickness of the uncompressed gasket 91. This bead 97 is formed with axially opposed sealing areas 98, 98 engaging the faces of the flanges 90 and 90a. Integrally formed with the metal of the bead is a radially outwardly extending web 99, the outer periphery of which is of a diameter greater than the diameter of the wall 94 and extends into the groove 95. It will be apparent that the bead 97 of the protective seal 96 is adjacent to the inner wall of the joint flanges and that this bead is connected with the gasket in a manner substantially identical with that in the structures previously described and this protective seal protects the gasket and adjacent joint surfaces in like manner as in the previously described forms of this invention.

Also, in the broader aspects of this invention, it is not essential that the protecting seal element be formed of sheet metal, as the seal may be formed of other resilient materials and may even taken other forms without departing from the scope of the invention.

In the foregoing description, certain terms have been utilized for brevity, clearness and understanding; but no unnecessary limitations should be implied therefrom because such words are utilized for descriptive purposes herein and not for the purpose of limitation, and are intended to be broadly construed.

Many other modifications of this invention and its application, in addition to those shown, will naturally occur to those skilled in this art and the present disclosures should therefor be considered as typical only and applicant desires not to be limited to the exact construction shown and described.

What I claim is:

1. As an article of manufacture, an annular element adapted to protect a gasket interposed between sealing joint faces against deterioration from the sealed fluid, comprising at its inner periphery a hollow bead formed of resilient sheet metal and having the conformation of a torus, and a web integrally formed with the metal of the wall of the bead extending radially outwardly from the bead in a plane substantially coincident with the median plane of the bead and adapted to have its outer edge connected to said gasket.

2. As an article of manufacture, an annular element adapted to protect a gasket interposed between sealing joint faces against erosion from the sealed fluid, comprising at its inner periphery a hollow bead formed of resilient sheet metal and having the conformation of a torus, the bead being formed with an aperture in its inner wall and with a periperal slot adjacent its outer median plane, and a web integrally formed with the metal of the wall of the bead extending radially outwardly from the bead in a plane substantially coincident with the median plane of the bead.

3. A gasket unit comprising a fluid sealing gasket ring formed with axially opposed sealing areas and inner and outer side walls, a gasket protective element comprising an axially resilient sheet metal ring disposed inwardly of and substantially concentric with the gasket ring and having axially opposed face portions and an inwardly facing wall resiliently connecting the face portions, and yielding means separate from said gasket ring and integral with said sheet metal ring mounted on the inner wall of said gasket ring.

4. A gasket construction comprising a relatively rigid fluid sealing ring formed with axially opposed sealing areas and inner and outer side walls, a resilient sheet metal ring of less initial thickness in an axial direction than the sealing ring, said resilient ring being spaced inwardly from and disposed concentrically with and substantially in the same median plane as the rigid ring, and means relatively yielding in an axial direction interlocking the resilient ring with the inner wall of the rigid ring.

5. In combination a relatively incompressible ring type gasket and an auxiliary relatively compressible gasket protective ring, the gasket being formed on its inner face with an inwardly projecting ridge, the ring being formed of sheet metal and comprising a tubular bead spaced interiorly of and coaxially with the gasket and means connected with the bead and seated upon the ridge adapted to operatively lock the ring to the gasket.

6. In combination a relatively incompressible ring type gasket, a relatively compressible gasket protective device disposed interiorly of and spaced from and substantially coaxial with the gasket, and means interlocking the gasket protective device with the gasket, said means providing for limited axial and radial loose play between the gasket and the gasket protective device.

7. A joint comprising two opposed members having a fluid conducting bore, a relatively solid fluid sealing gasket interposed between the opposed members and constituting a complete primary seal for the joint, a gasket protective element interposed between the said members and interiorly of the sealing gasket, the element comprising a hollow substantially tubular resilient bead and means associated with the bead engaging the gasket for fixing the resilient element with respect to the gasket and spacing the resilient element concentrically with the gasket, and means for simultaneously forcing said members into fluid sealing engagement with the gasket and into resilient engagement with the tubular element whereby fluid passing the bead into the space between the bead and the sealing gasket will be prevented from circulating in said space in free communication with the body of fluid in said bore.

8. A joint comprising two juxtaposed connections surrounding an opening, the connections being formed with opposed gasket engaging surfaces and with opposed parallel faces disposed interiorly of the surfaces and peripherally adjacent the opening, a fluid sealing gasket ring engaging the surfaces and constituting a complete primary seal for the joint, a relatively compressible ring resiliently engaging the opposed parallel faces at areas peripherally adjacent the opening, the gasket ring and the compressible ring being axially and radially interlocked and being spaced from each other whereby an annular chamber is formed between the rings and between the connections, aperture means formed in the compressible ring forming a communication between the chamber and the opening, and means for maintaining the members in fluid tight relation with the gasket ring and in resilient engagement with the compressible ring.

9. A joint comprising two juxtaposed connections surrounding an opening, the connections being formed with opposed coaxial grooves and with opposed parallel faces disposed interiorly of the grooves and peripherally adjacent the opening, a relatively rigid wedge ring seated in the grooves in fluid tight relation, a relatively compressible ring resiliently engaging the opposed parallel faces peripherally adjacent the opening, the wedge ring and the compressible ring being axially and radially interlocked with limited axial and radial play sufficient to permit the rigid ring and the compressible ring each to assume its respective seating position independently of restraint by the position of the other ring, and means for maintaining the members in fluid tight relation with the rigid ring and in resilient engagement with the compressible ring.

10. In combination, a gasket and a protective element therefor comprising an annular body of sheet material having an outer web connected to the inner wall of the gasket and having its inner edge beaded to provide a relatively compressible ring, said web being flexible axially to distort the web for manual disengagement from the gasket.

11. In combination, a gasket having a groove in its inner wall and a protective element for said gasket comprising an annular body of sheet material having an outer web seated in said groove and having its inner edge beaded to provide a relatively compressible ring, said web being flexible axially for manual distortion of the web to snap the same into and out of said groove.

12. In combination, a relatively incompressible ring-joint gasket and a protective element therefor comprising an annular body of flexible sheet metal having an outer web connected to the inner wall of the ring-joint gasket and having its inner edge beaded to provide a hollow, relatively compressible ring, said web being flexible axially to distort the web temporarily for manual disengagement from the ring-joint gasket.

13. In combination, a relatively incompressible ring-joint gasket having a groove in its inner wall and a protective element for said gasket comprising an annular body of flexible sheet metal having an outer web seated in said groove and having its inner edge beaded to provide a relatively compressible hollow ring, said web being flexible axially for manual temporary distortion of the web to snap the same into and out of said groove.

FREDERICK W. GOETZE.